United States Patent
Seneviratne et al.

(10) Patent No.: US 7,121,295 B2
(45) Date of Patent: Oct. 17, 2006

(54) INTERNAL BLOW OUT PREVENTER BALL AND SEAT

(75) Inventors: Padmasiri Daya Seneviratne, Fullerton, CA (US); Lawrence Wells, Yorba Linda, CA (US); David B. Mason, Anaheim Hills, CA (US)

(73) Assignee: Varco I/P, Inc., Orange, CA (US)

( * ) Notice: Subject to any disclaimer, the term of this patent is extended or adjusted under 35 U.S.C. 154(b) by 0 days.

(21) Appl. No.: 10/971,468

(22) Filed: Oct. 21, 2004

(65) Prior Publication Data

US 2005/0081918 A1    Apr. 21, 2005

Related U.S. Application Data

(60) Provisional application No. 60/513,252, filed on Oct. 21, 2003.

(51) Int. Cl.
*F16L 7/00*    (2006.01)
(52) U.S. Cl. .................. 137/375; 137/613; 251/315.01; 251/315.16
(58) Field of Classification Search ................ 137/375, 137/613; 251/315.01–16, 368
See application file for complete search history.

(56) References Cited

U.S. PATENT DOCUMENTS

| | | | |
|---|---|---|---|
| 3,042,066 A * | 7/1962 | Wolfensperger | 137/246.11 |
| 3,109,623 A * | 11/1963 | Bryant | 251/172 |
| 3,150,681 A * | 9/1964 | Hansen et al. | 137/454.2 |
| 3,180,351 A * | 4/1965 | Wolfensperger | 137/246.18 |
| 3,216,696 A * | 11/1965 | Cooley et al. | 251/175 |
| 4,117,694 A * | 10/1978 | Belmore | 62/55.5 |
| 5,251,869 A | 10/1993 | Mason | |
| 5,271,427 A * | 12/1993 | Berchem | 137/375 |
| 5,339,864 A | 8/1994 | Carbaugh et al. | |
| 5,353,832 A * | 10/1994 | Berchem | 135/375 |
| 5,364,064 A | 11/1994 | Carlson et al. | |
| 5,478,047 A * | 12/1995 | Best et al. | 251/172 |
| 5,638,855 A | 6/1997 | Morrill | |
| 5,642,754 A * | 7/1997 | Rabby | 137/613 |
| 5,642,872 A | 7/1997 | Morrill | |
| 5,645,098 A | 7/1997 | Morrill | |
| 5,647,572 A | 7/1997 | Morrill | |
| 5,655,745 A | 8/1997 | Morrill | |
| 5,806,563 A * | 9/1998 | Rabby | 137/613 |
| 6,073,648 A * | 6/2000 | Watson et al. | 137/375 |
| 6,276,450 B1 | 8/2001 | Seneviratne | |
| 6,435,474 B1 * | 8/2002 | Williams et al. | 251/315.05 |
| 6,736,207 B1 | 5/2004 | Luca et al. | |

OTHER PUBLICATIONS

Electro-Coatings web page bulletin, Properties of Kanigen.*
International Search Report dated Jan. 19, 2006 for PCT/US2004/035026 filed Oct. 21, 2004 mailed Feb. 15, 2006, 2 pgs.
Written Opinion completed Feb. 8, 2006 for PCT/US2004/035026 filed Oct. 21, 2004 mailed Feb. 15, 2006, 5 pgs.

* cited by examiner

*Primary Examiner*—Eric Keasel
*Assistant Examiner*—Craig Price
(74) *Attorney, Agent, or Firm*—Christie, Parker & Hale, LLP

(57) ABSTRACT

An internal blow out preventer is provided that includes a ball valve including a tubular assembly having a central passageway with upper and lower seats mounted therein. A ball is rotatably received between the upper and lower seats and includes an external surface and a central opening, wherein the central opening includes an undercut. A protective coating is applied to both the external surface and the undercut of the ball.

16 Claims, 3 Drawing Sheets

INTERNAL BLOW OUT PREVENTER BALL AND SEAT

CROSS-REFERENCE TO RELATED APPLICATION(S)

This application claims priority under 35 U.S.C. § 119(e) to U.S. Provisional Application Ser. No. 60/513,252, filed on Oct. 21, 2003, which is incorporated herein by reference.

FIELD OF THE INVENTION

The current invention is directed to an internal blow out preventer for an oil and gas well system; and more particularly to an internal blow out preventer having a ball valve with an improved protective coating applied thereto for improving the durability of the internal blow out preventer.

BACKGROUND OF THE INVENTION

Internal blow out preventers typically include a tubular having upper and lower seats mounted therein and rotatably receiving a ball. Together these components form a ball valve for checking pressure and preventing blow outs in high pressure drilling applications. During operation, the seats have surfaces that contact portions of the external surface of the ball. These contacted portions of the ball experience wear due to prolonged contact with the seats and can fail over time due to extended wear.

To improve the durability of the ball valve a protective coating is often added to the external surface of the ball where it contacts the seats. The juncture of the central opening of the ball and the external surface of the ball creates a sharp/vulnerable edge. Since the protective coating extends from the external surface of the ball up to this vulnerable edge, but not into the central opening of the ball, exposure of this vulnerable edge to high velocity drilling mud and periodic hydrostatic testing of the internal blow out preventer valve at pressures up to 16,000 psi, as required by some drilling systems, often leads to the coating being peeled back or stripped away starting at this vulnerable edge, causing the internal blow out preventer to fail.

The seats also include central openings aligned with the central opening of the ball to allow drilling mud to flow therethrough. The manufacturing tolerances of some internal blow out preventers result in the inside diameter of the ball being smaller than the inside diameter of the upper seat. This exposes the juncture of the external surface of the ball and the central opening of the ball and increases the probability of the coating being stripped from the ball.

Accordingly, a need exists for an improved internal blow out preventer with increased durability.

SUMMARY OF THE INVENTION

In one embodiment, the present invention is an internal blow out preventer that includes a ball valve including a tubular assembly having a central passageway with upper and lower seats mounted therein. A ball is rotatably received between the upper and lower seats and includes an external surface and a central opening, wherein the central opening includes an undercut. A protective coating is applied to both the external surface and the undercut.

In another embodiment, the present invention is an internal blow out preventer that includes a ball valve including a tubular assembly having a central passageway with upper and lower seats mounted therein. A ball is rotatably received between the upper and lower seats, and includes a central opening and an upper contacting surface that contacts a contacting surface of the upper seat. The central opening includes an upper undercut at an upper end of the ball. A protective coating is applied to both the upper contacting surface and the upper undercut of the ball.

In yet another embodiment, the present invention is an internal blow out preventer having a first ball valve that includes a first tubular assembly with a central passageway having a first upper seat and a first lower seat mounted in therein. A first ball is rotatably received between the first upper and lower seats, and includes a central opening and an upper contacting surface that contacts a contacting surface of the first upper seat. The central opening includes an upper undercut at an upper end of the first ball. A first protective coating is applied to both the upper contacting surface and the upper undercut of the first ball. The internal blow out preventer also includes a second ball valve having a second tubular assembly threadably connected to the first tubular assembly and having a central passageway with a second upper seat and a second lower seat mounted therein. A second ball is rotatably received between the second upper and lower seats, and includes a central opening and an upper contacting surface that contacts a contacting surface of the second upper seat. The central opening includes an upper undercut at an upper end of the second ball. A second protective coating is applied to both the upper contacting surface and the upper undercut of the second ball.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

As shown in FIGS. 1–6, embodiments of the present invention are directed to an internal blow out preventer having a tubular with upper and lower seats mounted therein, which rotatably retain a ball therebetween. In one embodiment, the ball includes a central opening having an undercut allowing a protective coating to be applied to an external surface of the ball; wrapped around a junction of the external surface and the central opening of the ball; and attached to the undercut. The extension of the protective coating into the undercut increases the durability of the internal blow out preventer as described in detail below.

Figure 1:
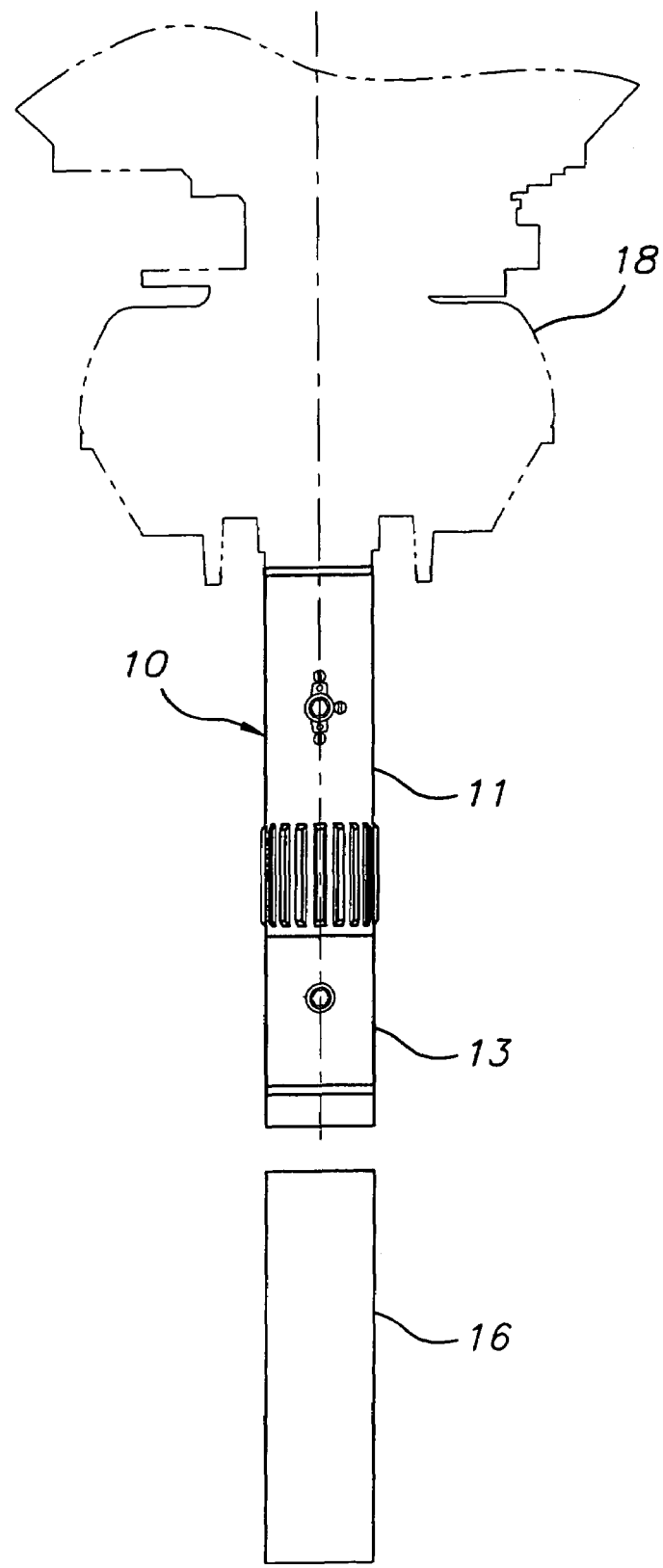
FIG. 1, is a schematic side view of an internal blow out preventer according to an exemplary embodiment of the present invention, along with a top drive system and a drill string to which the internal blow out preventer may be attached during a drilling operation.

FIG. 1 shows an internal blow out preventer 10 according to an exemplary embodiment of the present invention. The internal blow out preventer 10 provides a pressure check valve to prevent the blow out of an oil and gas well from a back pressure build-up during drilling operations. In one embodiment, the internal blow out preventer 10 is threadably connected to a drill string 16, and is driven by a top drive system 18 during a drilling operation.

Figure 2:
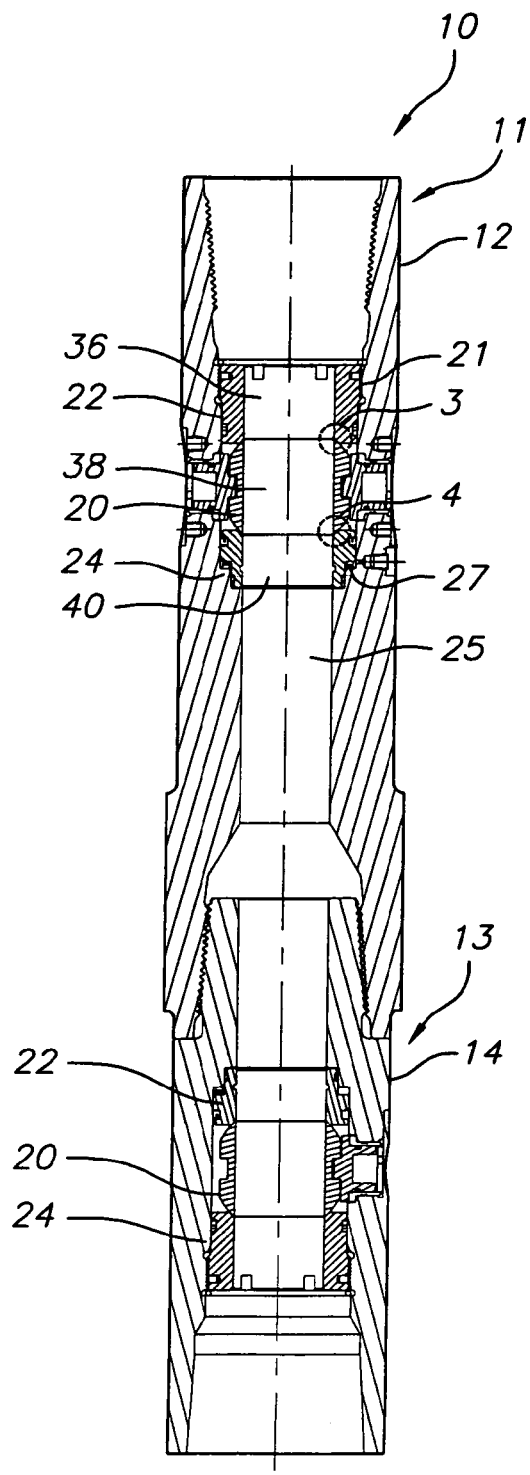
FIG. 2, is a cross-sectional view of the internal blow out preventer of FIG. 1, having an upper ball valve including an upper tubular assembly with a ball and ball seats and a lower ball valve including a lower tubular assembly with a ball valve and ball valve seats.

In the depicted embodiment, the internal blow out preventer 10 includes an upper ball valve 11, including an upper tubular assembly 12 having an upper seat 22 and a lower seat 24 mounted therein. A ball 20 is rotatably received between the upper and lower seats 22 and 24. The upper tubular assembly 12, the ball 20 and the upper and lower seats 22 and 24 together form the upper ball valve 11. In the embodiment of FIG. 2, the ball 20 and seats 22 and 24 are mounted in a central passageway 25 in the upper tubular assembly 12 by positioning a lower end of the lower seat 24 in abutment with a shoulder 27 in the central passageway 25; positioning a lower end of the ball 20 in abutment with an upper end of the lower seat 24; and placing a lower end of the upper seat 22 in abutment with an upper end of the ball 20. In one embodiment, the upper seat 22 includes threads 21 that threadably engage threads in the central passageway 25 of the upper tubular assembly 12 in order to prevent vertical displacement of itself, as well as the ball 20 and the lower seat 24.

As shown in FIG. 2, the ball 20 and seats 22 and 24 each have central openings 36, 38 and 40 axially aligned with each other and with the longitudinal axis of the central passageway 25 in the upper tubular assembly 12. As shown by the arrow, drilling mud flows downwardly through each of the openings 36, 38 and 40.

As is also shown in FIGS. 2 (and enlarged in FIGS. 3 and 4), with the ball 20 and seats 22 and 24 positioned as described above, the ball 20 has an upper contact surface 26 that contacts a contact surface 28 of the upper seat 22; and a lower contact surface 30 that contacts a contact surface 32 of the lower seat 34. In order to reduce wear between these surfaces, each contact surface 26, 28, 30 and 32 is coated with a protective coating (shown for example in FIG. 6, as protective coating 40). The protective coating may be applied by any appropriate coating method and the protective coating may be any coating appropriate for reducing wear. For example, in one embodiment, the protective coating is a hard protective coating such as tungsten carbide.

As described above, a problem with internal blow out preventers of the prior art is that a protective coating is applied to the external surface of the ball, but does not extend into the central opening of the ball. As a result the coating often peels off of the ball valve at the junction of the external surface of the ball and the central opening of the ball.

Figure 5:
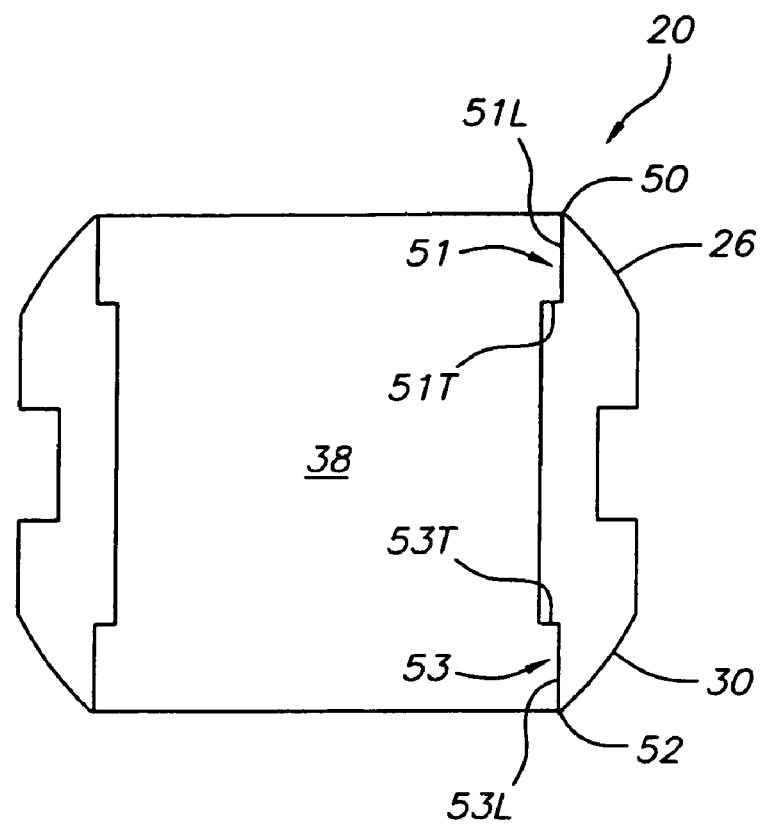
FIG. 5, is a schematic view of the ball of the internal blow out preventer of FIG. 1 having an undercut for receiving a protective coating, with the protective coating omitted for clarity purposes.
Figure 6:
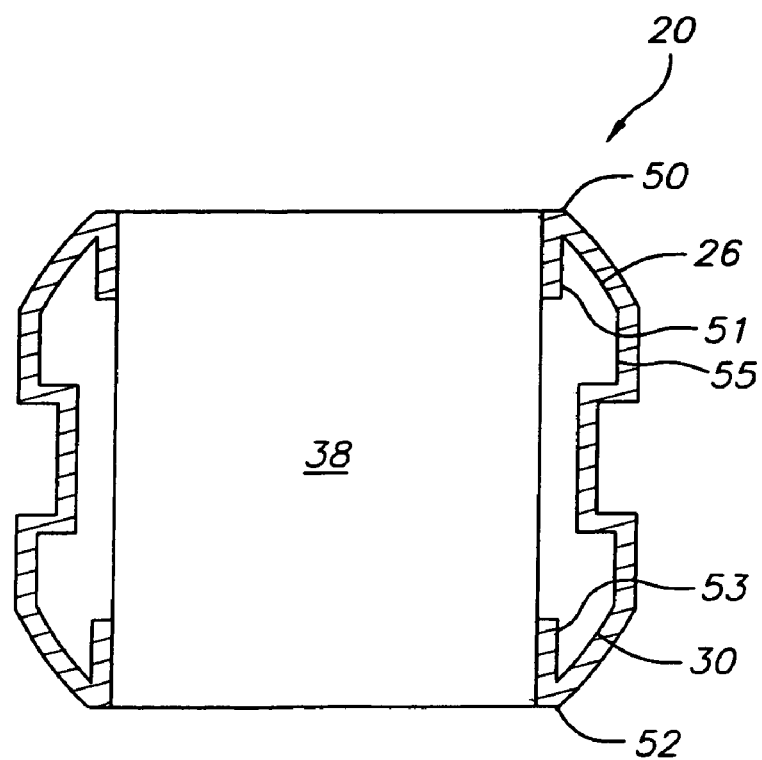
FIG. 6, is a schematic view of the ball of FIG. 5 with a protective coating attached to each of an external surface and the undercuts of the ball (note this drawing is not to scale, the protective coating is oversized for clarity purposes).

As show in FIG. 5, in one embodiment according to the present invention, an undercut 51 and 53 is cut into the upper and lower ends, respectively, of the ball 20, creating a circumferential groove at each end of the ball 20. These undercuts 51 and 53 allow the protective coating 40 (as described above) to be applied to an external surface 55 of the ball 20; wrapped around the junctions 50 and 52 of the external surface 55 and the central opening 38 of the ball 20; and attached to the undercuts 51 and 53. Such an arrangement reduces the likelihood of the protective coating 40 peeling away at the junctions 50 and 52, as is problematic with the prior art.

In the depicted embodiment, shown for example in FIG. 5, the undercuts 51 and 53 each include a longitudinal component 51L and 53L and a transverse component 51T and 53T. As shown, the longitudinal components 51L and 53L extend substantially parallel to the central opening 38 of the ball 20 and extend slightly inward from the central opening 38 forming a slightly larger opening than that of the central opening 38. The transverse components 51T and 53T define the depth of the undercuts 51 and 53. In a prefered embodiment, the depth of the undercuts 51 and 53 is controlled by the desired thickness of the protective coating 40. This is due to the desirability of having the outer surface of the protective coating 40 flush with the inner surface of the central opening 38. This flush arrangement helps prevent peeling of the protective coating 40 from the undercuts 51 and 53. Merely by way of example, in one embodiment, the depth of the undercuts 51 and 53 and the thickness of the protective coating are each in the range of approximately 0.008 inches to 0.010 inches.

Figure 3:
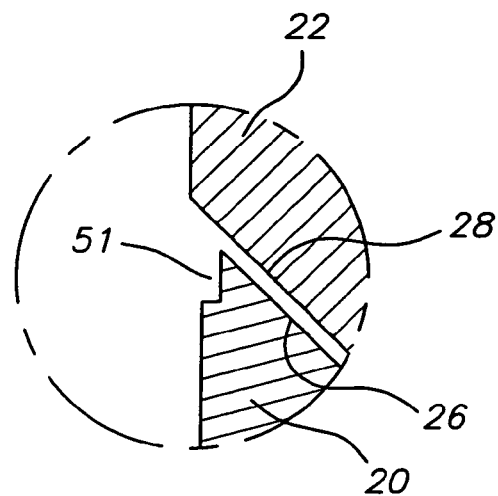
FIG. 3, is an enlarged view of contacting portions of the ball with an upper seat of the internal blow out preventer of FIG. 1, with protective coatings omitted for clarity.
Figure 4:
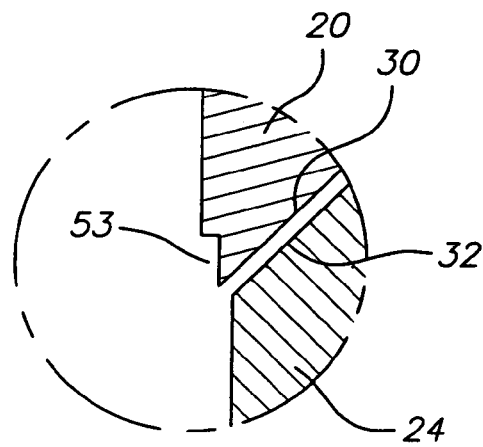
FIG. 4, is an enlarged view of contacting portions of the ball with a lower seat of the internal blow out preventer of FIG. 1, with protective coatings omitted for clarity.

In order to improve the fluid flow of the drilling mud through the internal blow out preventer 10, in one embodiment shown for example in FIGS. 2–4, the diameter of the central opening 38 in the ball 20 is slightly larger than the diameter of the central opening 36 in the upper seat 22 (see FIG. 3); and the diameter of the central opening 40 in the lower seat 24 is slightly larger than the diameter of the central opening 38 in the ball 20 (see FIG. 3). In such an arrangement, the drilling mud is able to flow smoothly from the central opening 36 in the upper seat 22 to the slightly larger central opening 38 in the ball 20 and smoothly flow from the central opening 38 in the ball 20 to the slightly larger central opening 40 in the lower seat 24. In addition, this arrangement lessens the impact of the mud flow on the upper ball junction 50 (since the junction 50 is inset from the central opening 36 of the upper seat 22) and thereby further reduces the likelihood of the protective coating 40 peeling away at the upper ball junction 50.

In the embodiment of FIG. 2, the internal blow out preventer 10 further includes a lower ball valve 13 threadably connected the upper ball valve 11. The lower ball valve 11 includes a lower tubular assembly 14 having an upper seat 22 and a lower seat 24 mounted therein; and a ball 20 rotatably received between the upper and lower seats 22 and 24 as described above. The lower tubular assembly 14, the ball 20 and the upper and lower seats 22 and 24 together form the lower ball valve 13.

Although specific embodiments are disclosed herein, it is expected that persons skilled in the art can and will design alternative internal blow out preventer systems and methods that are within the scope of the following claims either literally or under the Doctrine of Equivalents.

What is claimed is:

1. An internal blow out preventer comprising:
   a ball valve comprising:
      a tubular assembly comprising a central passageway;
      an upper seat mounted within the tubular assembly;
      a lower seat mounted within the tubular assembly;
      a ball rotatably received between the upper and lower seats and comprising an external surface and a central opening defining a fluid passage, said fluid passage having a first diameter, and wherein the central opening further comprises an undercut portion at the junction between the external surface and the central opening, said undercut portion having a second diameter that is greater than the first diameter of the fluid passage; and
a protective coating applied to both the external surface and the central opening of the ball, and which is attached and terminates within the undercut of the ball such that coated undercut portion has a diameter that is substantially the same as the first diameter of the fluid passage.

2. The internal blow out preventer of claim 1, wherein the protective coating comprises a hard protective coating capable of reducing wear between the ball and the seats.

3. The internal blow out preventer of claim 1, wherein the protective coating comprises tungsten carbide.

4. The internal blow out preventer of claim 1, wherein the upper seat comprises a central opening axially aligned with both the central passageway of the tubular assembly and the central opening of the ball; and wherein the central opening of the ball is larger than the central opening of the upper seat.

5. The internal blow out preventer of claim 4, wherein the lower seat comprises a central opening axially aligned with both the central passageway of the tubular assembly and the central opening of the ball; and wherein the central opening of the lower seat is larger than the central opening of the ball.

6. The internal blow out preventer of claim 1, wherein the undercut is in the upper end of the ball.

7. The internal blow out preventer of claim 6, further comprising a lower undercut portion at the junction of the external surface and the central opening in the lower end of the ball, and wherein the protective coating is applied to the external surface and both ends of the central opening such that the protective coating is attached and terminates in both the upper undercut and the lower undercut of the ball such that coated undercut portions have a diameter that is substantially the same as the first diameter of the fluid passage.

8. An internal blow out preventer comprising:
a ball valve comprising:
a tubular assembly comprising a central passageway;
an upper seat mounted in the central passageway of the tubular assembly;
a lower seat mounted in the central passageway of the tubular assembly;
a ball rotatably received between the upper and lower seats, and comprising a central opening defining a fluid passage, said fluid passage having a first diameter, and an upper contacting surface that contacts a contacting surface of the upper seat, and wherein the central opening comprises an upper undercut portion at the junction between the upper contacting surface and the central opening, said undercut portion having a second diameter that is greater than the first diameter of the fluid passage, said undercut portion being disposed at an upper end of the ball; and
a protective coating applied to the upper contacting surface and the central opening such that the protective coating is attached and terminates in the upper undercut of the ball such that the coated undercut portion has a diameter that is substantially the same as the first diameter of the fluid passage.

9. The internal blow out preventer of claim 8, wherein the protective coating comprises a hard protective coating capable of reducing wear between the ball and the seats.

10. The internal blow out preventer of claim 8, wherein the protective coating comprises tungsten carbide.

11. The internal blow out preventer of claim 8, wherein the upper seat comprises a central opening axially aligned with both the central passageway of the tubular assembly and the central opening of the ball; and wherein the central opening of the ball is larger than the central opening of the upper seat.

12. The internal blow out preventer of claim 11, wherein the lower seat comprises a central opening axially aligned with both the central passageway of the tubular assembly and the central opening of the ball; and wherein the central opening of the lower seat is larger than the central opening of the ball.

13. The internal blow out preventer of claim 8, wherein the ball comprises a lower contacting surface that contacts a contacting surface of the lower seat; and wherein the central opening comprises a lower undercut portion at the junction of the lower contacting surface and the central opening at a lower end of the ball; and wherein the protective coating is applied to each of the upper and lower contacting surfaces and the central opening such that the protective coating is attached and terminates in the upper and lower undercuts of the ball such that coated undercut portions have a diameter that is substantially the same as the first diameter of the fluid passage.

14. An internal blow out preventer comprising:
a first ball valve comprising:
a first tubular assembly comprising a central passageway;
a first upper seat mounted in the central passageway of the first tubular assembly;
a first lower seat mounted in the central passageway of the first tubular assembly;
a first ball rotatably received between the first upper and lower seats, and comprising a central opening defining a fluid passage, said fluid passage having a first diameter, and an upper contacting surface that contacts a contacting surface of the first upper seat, and wherein the central opening includes an upper undercut portion at the junction between the upper contacting surface and the central opening, said undercut portion having a second diameter that is greater than the first diameter of the fluid passage, said undercut portion being disposed at an upper end of the first ball; and
a first protective coating applied to both the upper contacting surface and the central opening such that the protective coating is attached and terminates in the upper undercut of the first ball such that the coated undercut portion has a diameter that is substantially the same as the first diameter of the fluid passage; and
an second ball valve comprising:
a second tubular assembly threadably connected to the first tubular assembly and comprising a central passageway;
a second upper seat mounted in the central passageway of the second tubular assembly;
a second lower seat mounted in the central passageway of the second tubular assembly;
a second ball rotatably received between the second upper and lower seats, and comprising a central opening defining a fluid passage, said fluid passage having a first diameter, and an upper contacting surface that contacts a contacting surface of the second upper seat, and wherein the central opening includes an upper undercut portion at the junction between the upper contacting surface and the central opening, said undercut portion having a second diameter that is greater than the first diameter of the fluid passage, said undercut portion being disposed at an upper end of the second ball; and a second protective coating applied to both the upper contacting surface and the central opening such that the protective coating is attached and terminates in the upper undercut of the second ball such that the coated undercut portion has a diameter that is substantially the same as the first diameter of the fluid passage.

15. The internal blow out preventer of claim 14, wherein the first and second protective coatings each comprise a hard protective coating capable of reducing wear between the ball and the seats.

16. The internal blow out preventer of claim 14, wherein the first and second protective coatings each comprise tungsten carbide.

* * * * *